United States Patent
Pettitt et al.

(10) Patent No.: US 8,411,206 B2
(45) Date of Patent: Apr. 2, 2013

(54) APPARATUS AND METHOD FOR DECODING EXTENDED COLOR SPACE DATA

(75) Inventors: Gregory S. Pettitt, Farmersville, TX (US); Rajeev Ramanath, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1318 days.

(21) Appl. No.: 11/965,671

(22) Filed: Dec. 27, 2007

(65) Prior Publication Data

US 2009/0167955 A1 Jul. 2, 2009

(51) Int. Cl.
- H04N 7/173 (2006.01)
- H04N 5/46 (2006.01)
- G09G 5/00 (2006.01)
- G06K 9/00 (2006.01)
- H04N 9/64 (2006.01)

(52) U.S. Cl. ........ 348/661; 348/624; 348/557; 348/651; 382/167

(58) Field of Classification Search .................. 348/649, 348/650, 557, 624, 708, 651, 653, 661; 382/167; 345/591, 602, 604
See application file for complete search history.

(56) References Cited

U.S. PATENT DOCUMENTS

| | | | | |
|---|---|---|---|---|
| 5,528,296 A * | 6/1996 | Gove et al. | | 348/275 |
| 5,677,741 A * | 10/1997 | Yui | | 348/649 |
| 5,726,682 A * | 3/1998 | Lum et al. | | 345/604 |
| 5,784,050 A * | 7/1998 | Corry | | 345/604 |
| 6,215,913 B1 * | 4/2001 | Clatanoff et al. | | 382/275 |
| 6,268,847 B1 * | 7/2001 | Glen | | 345/604 |
| 6,342,898 B1 * | 1/2002 | Pettitt | | 345/601 |
| 6,594,387 B1 * | 7/2003 | Pettitt et al. | | 382/167 |
| 7,164,397 B2 | 1/2007 | Pettitt et al. | | |
| 7,181,065 B2 | 2/2007 | Pettitt et al. | | |
| 7,184,080 B2 * | 2/2007 | Kehtarnavaz et al. | | 348/223.1 |
| 7,545,533 B2 * | 6/2009 | Ok et al. | | 358/1.9 |
| 7,688,331 B2 * | 3/2010 | Yoon et al. | | 345/591 |
| 2001/0015774 A1 * | 8/2001 | Endo et al. | | 348/807 |
| 2004/0199346 A1 * | 10/2004 | Stokes | | 702/88 |
| 2005/0062756 A1 * | 3/2005 | Dyke et al. | | 345/604 |
| 2006/0203120 A1 * | 9/2006 | Jun | | 348/364 |
| 2007/0091213 A1 * | 4/2007 | Jaspers | | 348/687 |
| 2007/0109431 A1 * | 5/2007 | Lee | | 348/254 |
| 2007/0133021 A1 * | 6/2007 | Lee et al. | | 358/1.9 |
| 2007/0140558 A1 * | 6/2007 | Pettitt et al. | | 382/167 |
| 2008/0284915 A1 * | 11/2008 | Figueroa et al. | | 348/649 |
| 2009/0085924 A1 * | 4/2009 | Ben-Chorin et al. | | 345/591 |

* cited by examiner

*Primary Examiner* — Pankaj Kumar
*Assistant Examiner* — Reuben M Brown
(74) *Attorney, Agent, or Firm* — Warren L. Franz; Wade J. Brady, III; Frederick J. Telecky, Jr.

(57) ABSTRACT

In one embodiment, an image decoding system for a $YC_bC_r$ formatted signal includes a color space converter capable of representing an RGB image signal with one or two negative image signal components. The image decoding system further includes a degamma correction unit and an image signal formatter. An offset of the image black level from zero corresponding to the image signal offset produced by the color space converter is employed to perform degamma correction. In a further embodiment, gain, offset, and sign are removed from the image signal produced by the color space converter prior to degamma correction. The image signal formatter may utilize a one-dimensional and a three-dimensional lookup table to produce an image signal that may include secondary and white image components. The system advantageously accommodates decoding xvYCC-encoded image data in conventional as well as new hardware display system architectures.

8 Claims, 4 Drawing Sheets

APPARATUS AND METHOD FOR DECODING EXTENDED COLOR SPACE DATA

TECHNICAL FIELD

Embodiments of this invention relate generally to an apparatus and method for image signal processing, and more particularly to image signal decoding methods and apparatus capable of decoding image signals in extended color spaces.

BACKGROUND

In imaging applications, electronic images are generated by image generation systems such as digital video cameras and scanners. The electronic images are delivered to and reproduced by image display systems, such as television receivers, projectors, and other display devices.

However, an image generated by an image generation system generally cannot be directly displayed by an image display system without further image processing because the color spaces may not be the same for the two systems. Even when the color spaces are functionally the same, the image produced by the image generation system may be in a data format different from the data format required by the display system. This problem can be solved by converting the generated image (i.e., the image data signals received by the image display system) into an image data format that is compatible with the image data format of the color space of the display system. Such image data conversion is often referred to as data decoding, and the converted image data are often referred to as decoded image data.

A number of techniques to represent a colored image with a signaling arrangement are presently known. For example, the RGB ("red-green-blue") color space is the signal arrangement that was originally developed for color CRTs (cathode-ray tubes). To reproduce a color image in a display device requires that the image be captured and encoded with a signaling arrangement in an image source and then be decoded and reproduced in the display device. Most of the current techniques for decoding signals representing an image in a display device are operable, however, only for positive image data during the decoding processes, which is not compatible with, and does not take advantage of, the extended color spaces of recently developed high performance display devices, such as DLP® display devices, which comprise DMD ("Digital Micrometer Device") display elements.

Following development of the RGB color-encoding system, the $YC_bC_r$ color-encoding standard was developed to provide a family of color spaces which can be stored and transmitted with greater signaling efficiency than RGB color-space signals. More recently, with a view toward providing improved color rendition in high-performance display devices that are now available, an xvYCC color encoding standard was developed and then published in January 2006 to utilize a wider color-space range than that provided by the $YC_bC_r$ standard, as described further hereinbelow. Signals representing color saturation levels that were out of bounds in the $YC_bC_r$ standard, particularly in guard bands at low and high video saturation levels, are permissible in the xvYCC standard. Guard bands at low and high video saturation levels were included in the $YC_bC_r$ standard to protect against signal overshoot in analog signal processing circuits. In addition, colors having negative excursions from a conventional triangular color gamut, which are impermissible in the $YC_bC_r$ color-encoding standard, can be encoded in the xvYCC standard.

Due to its superiority over traditional encoding schemes and standards, the xvYCC standard has rapidly become deployed in systems utilizing high performance display devices. With such growing use, it has become imperative for image display systems to be capable of decoding image signals in extended color spaces, such as that provided by the xvYCC color space, and/or be capable of handling negative color components during a decoding process.

Thus, what is needed in the art is an image signal decoding arrangement that overcomes these prior color-space limitations, including inability to handle signals representing negative color component excursions.

SUMMARY OF THE INVENTION

Embodiments achieve technical advantages as an image decoding system. In an advantageous embodiment, an image decoding system includes a decoding process capable of decoding image signal components in extended color spaces, such as image signal components of an image signal encoded in a $YC_bC_r$ format, and more particularly, capable of decoding negative image signal components during the decoding process. In an advantageous embodiment, the image decoding system includes a color space converter, a degamma unit, and an image signal formatter. In an advantageous embodiment, the image decoding system further includes an offset, gain, and sign correction pre-processing unit operative before signal processing in the degamma unit. In an advantageous embodiment, the image decoding system is capable of decoding an input in image signal including an image signal component with a black level offset from the origin of the image coordinate system.

BRIEF DESCRIPTION OF THE DRAWINGS

For a more complete understanding of the embodiments, and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the embodiments provide many applicable inventive concepts that can be embodied in a wide variety of specific contexts. The specific embodiments discussed are merely illustrative of specific ways to make and use the invention, and do not limit the scope of the invention.

Embodiments will be described with respect to preferred embodiments in a specific context, namely an apparatus and method using a color space converter, a degamma unit, and an image signal formatter, or an apparatus. However, the use of this specific context is for illustrative purposes and does not limit the scope of the invention or the appended claims.

The RGB color model, which has been widely used for many decades, is the commonly used color model in video display devices such as CRTs, which are typically driven by red, green, and blue voltage signals. The RGB color model can be implemented in different ways, depending on the capabilities of a particular display device. A common implementation employs 24 bits to represent the video signal associated with a pixel element in a video image, employing 8 bits to represent discrete levels of color in each of three video channels, i.e., a red, a green, and a blue video channel, representing three primary colors. Such a representation provides $256=2^8$ color levels per video channel, less any bit combinations reserved for signaling or other purposes. Alternatively, 16 bits (or another number of bits) can be employed per video channel, resulting in the same range of color but with a finer gradation of colors.

Figure 1:
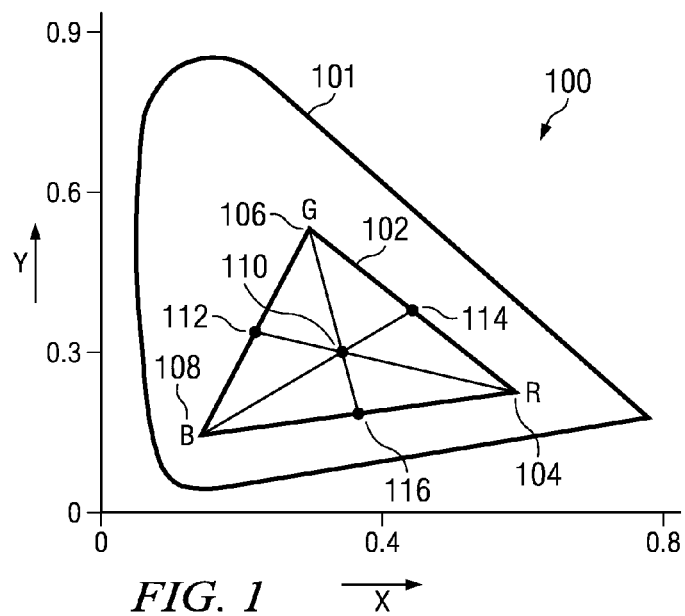
FIG. 1 illustrates a CIE 1931 XYZ x-y chromaticity diagram representing all visible colors for a typical human eye, and a more limited color rendition capability of a display system.

Turning now to FIG. 1, illustrated is a CIE 1931 XYZ xy chromaticity diagram 100 of a first display system. The CIE (International Commission on Illumination) 1931 XYZ color space is a three-dimensional representation of all humanly visible colors that was established in 1931 after a series of color-sensing experiments by W. David Wright and John Guild. The color space 101 is such a representation of all visible colors for a typical human eye. The triangular area 102 represents the color rendition capability of a particular display system, and is determined by the location of the display system's primary color points, i.e., the red point 104, the blue point 108, and the green point 106. The relative intensity of light provided at each of these points is represented by a dimension (not shown) normal to the plane of the figure. If each primary color provides the same intensity contribution to the white light level, then secondary color points will be located midway between the primary color points, and the white point 110 will be located at the intersection of the lines connecting the primary and secondary colors as shown in FIG. 1. In FIG. 1, the cyan point 112, yellow point 114, and magenta point 116, are respectively located midway between the primary color points.

The "sRGB" image display standard is a digital RGB color space widely adopted by the display industry, and typically uses eight bits per channel. The sRGB image display standard is described in specification IEC/4WD 61966-2-1 entitled "Color Measurement and Management in Multimedia Systems and Equipment, Part 2-1: Default RGB Color Space-sRGB", dated May 28, 1998. The sRGB standard defines the chromaticities of the red, green, and blue primary colors with respect to the x,y coordinates illustrated in FIG. 1 as the red point 104 at [0.6400, 0.3300], the green point 106 at [0.3000, 0.6000], and the blue point 108 at [0.1500, 0.0600], and the white point 110 at [0.3127, 0.3290]. These primary colors are limited to a range of digital values of 16 to 239 (on a scale of zero to 255 represented by 8 bits) with guard bands as described further hereinbelow. Thus, a display device operable over the triangular color space 102 defined by its three primary colors and using positive RGB signals does not display all the colors ordinarily visible to a human eye. The undisplayed colors, of course, are the colors outside the triangular color space 102 but within the color space 101.

RGB signals, although convenient for driving a display device such as a CRT, are not efficient for image storage and transmission, since they do not take advantage of certain physiological limitations of human visual perception. The $YC_bC_r$ color model, sometimes abbreviated to YCC, provides a family of color spaces which can be stored and transmitted with greater efficiency than RGB color-space signals, relying on certain human visual perception characteristics. The Y element in the $YC_bC_r$ color model represents a luminance component, and $C_b$ and $C_r$ represent, respectively, blue and red chrominance components. The luminance component is stored with higher resolution and transmitted with wider bandwidth than the $C_b$ and $C_r$ components, which are otherwise treated with less accuracy and bandwidth for improved system efficiency without compromising the visual appearance of an image. The $YC_bC_r$ color model provides a way of encoding RGB information with signal-processing advantages for video signal transmission across a band-limited and power-limited channel.

Figure 2:
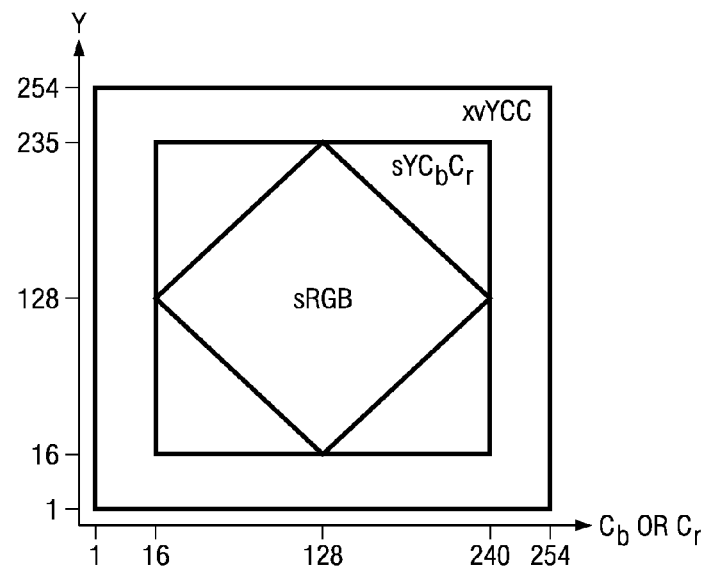
FIG. 2 illustrates the color gamut of an sRGB signal in the ITU-R BT.709-2 standard, the color gamut of the $sYC_bC_r$ standard, and the color gamut of the xvYCC standard.

In International Telecommunications Union standards ITU-R BT.601 (also referred to as CCIR 601) and ITU-R BT.709-2, color components in the $YC_bC_r$ color model can be represented by 8-bit words. FIG. 2 illustrates such a digital representation. A luminance signal Y is plotted on the vertical axis, and chrominance signals, $C_b$ or $C_r$, are plotted on horizontal axes normal to the vertical axis, one of which is illustrated in the figure. The diamond-shaped sRGB figure is thus a projection of an sRGB color-space cube into the $YC_rC_b$ color space. The top and bottom apexes of the cube are white and black, respectively. The cube has six corners between black and white, two of which are visible in the plane of the figure. These six corners represent the highest luminous intensity points of the three primary and three secondary colors. A guard band is provided at either end of the digital range so that integer values only from 16 to 239 are admissible. The limited encoding range was established to accommodate undershoot and overshoot attributes of analog signaling for a television receiver or monitor, which would otherwise generate inadmissible negative RGB values or values beyond the maximum eight-bit digital limit of 255, which would wrap by modulo arithmetic into low RGB values. In an 8-bit luminance sample, the digital value 16 is used for black and 239 for white. The digital values 0 and 255 are used for sync encoding, and do not appear in this figure. The $C_b$ and $C_r$ samples use the value 128 to encode a zero chrominance value, which is used when encoding a white, grey or black pixel.

The ITU-R BT.709-2 standard allows only positive RGB values, represented by the diamond-shaped box sRGB, to be encoded into the $YC_bC_r$ color space. As a consequence, perfectly valid $YC_bC_r$ colors outside of the RGB gamut, such as those lying outside the area of the diamond-shaped sRGB box but within the visible space 101 illustrated in FIG. 1 and within the color space of a high-performance display cannot be represented. Such valid $YC_bC_r$ colors might generate one or two negative sRGB component values, which are just subtractive (rather than additive) color components. A physical display, such as a CRT, LCD, or DMD display, does not provide "color component subtraction," i.e., such a display is not responsive to negative RGB color components. Recall also, as mentioned above, that colors in the digital $YC_bC_r$ guard bands 1-16 and 240-254 are reserved to manage analog undershoot and overshoot.

The xvYCC color space, also referred to as extended-gamut YCC, was published in January 2006 by the IEC ("International Electrotechnical Commission") to support enhanced image display capabilities of high-performance image generation devices such as flat-screen television receivers and printers. Such high-performance image generation devices generally employ the wider visual spectrum that is available, such as with LED backlighting, thereby enabling an extension of the display color gamut. The xvYCC color space supports about 1.8 times as many colors as the sRGB color space and can thus reproduce an image with substantially improved color fidelity.

The xvYCC color space uses substantially the full range of digital values to represent colors (1 to 254 in an 8-bit space, reserving the values zero and 255 for synchronization), such as illustrated, without limitation, by the square box xvYCC in FIG. 2. With digital signaling of an image, there is no need to accommodate undershoot or overshoot. Thus, the values from 1-15 and 240-254 can be used to represent colors beyond the color range of the ITU-R BT.601 standard for the $YC_bC_r$ color model. Colors outside the color range of the ITU-R BT.601 standard can be readily captured, nonetheless, by currently available digital cameras. In order to maintain backward-compatibility with earlier standards, the red, green, blue, and white standard colors are still calculated at the same offset indices in the color space, i.e., the digital value 16 represents the absence of red, green, or blue for an 8-bit word, and the digital value 239 represents the color with full intensity. The wider ranges of digital values of color provided by the xvYCC color space standard allow representation of deeper greens, reds, and blues as well as intermediate colors that were previously beyond digital boundaries in the ITU-R BT.601 color space, but are still valid color points for a high-performance display. Thus, the RGB color values must be defined with reference to the color space of such a high-performance display.

Figure 3:
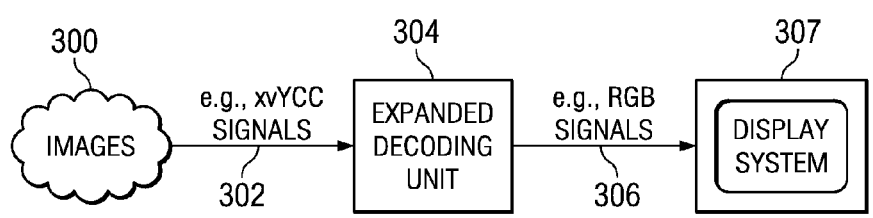
FIG. 3 illustrates a schematic diagram of an advantageous embodiment of an image signal decoding process.

Turning now to FIG. 3, illustrated schematically is a high-level diagram of a decoding process in an advantageous embodiment of the invention. Image source 300 provides image signals 302. The image source can be any image generation system, such as a camcorder or a digital camera, or an image storage device, such as a computer-readable storage, buffer, or any type of volatile or non-volatile digital storage device having image signals stored therein.

The image signals produced at an output by the image source 300 comply with a specific format in a color space. For example, image signals 302 may be $YC_bC_r$ image data in an extended YCC color space such as an xvYCC color space. The image source may provide image signals in addition to, or other than, image signals in an xvYCC color space.

The image signals 302 from the image source 300 are delivered to expanded decoding unit 304 that decodes the image signals 302, such as xvYCC image signals, into a stream of decoded image signals 306 in a format, such as RGB image data, that is compatible with a display system 307 selected for displaying the corresponding image. Expanded decoding unit 304 can be configured to decode image signals of multiple formats, including xvYCC image signals, into decoded image signals of other formats that are supported by the display system for displaying the corresponding image. Of course, expanded decoding unit 304 can be included within the physical structure of the display system 307.

Figure 4:
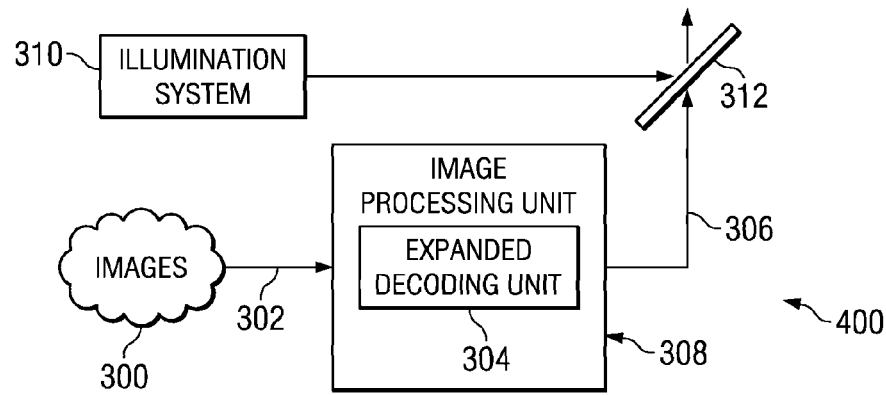
FIG. 4 illustrates a simplified schematic drawing of an exemplary advantageous embodiment of a display system including the decoding process illustrated in FIG. 3.

Turning now to FIG. 4, illustrated is an exemplary display system 400 including the decoding process illustrated in FIG. 3, constructed in an advantageous embodiment. The display system in this example comprises illumination system 310, light valve 312, image source 300, and image processing unit 308 that comprises expanded decoding unit 304, which can be implemented for use in a wide range of display systems. The display system illustrated in FIG. 4 can be an LCD or plasma television receiver, a rear-projection or a front-projection television receiver, or other type of image display system.

The illumination system 310 is designed to provide the illumination light for the display system, and may comprise any suitable illumination device, such as an incandescent lamp, a laser, a light-emitting diode, or an arc lamp.

Light valve 312 can be any suitable light valve comprising individually addressable pixels, such as reflective, deflectable micromirrors, liquid-crystal-on-silicon devices, as well as other light valve devices. Light valve 312 may also comprise devices that are self-light emitting, such as plasma cells, which may make the illumination system 310 unnecessary.

The image-processing unit 308 prepares image data that can be displayed by pixels in the light valve. As a functional module of the image-processing unit, expanded decoding unit 304 decodes received image signals 302 into decoded image signals 306 in a format (or formats) supported by the display system 400. Elements in FIG. 4, as in other following figures, with the same reference designation used in an earlier figure will not be redescribed in the interest of brevity.

Figure 5:
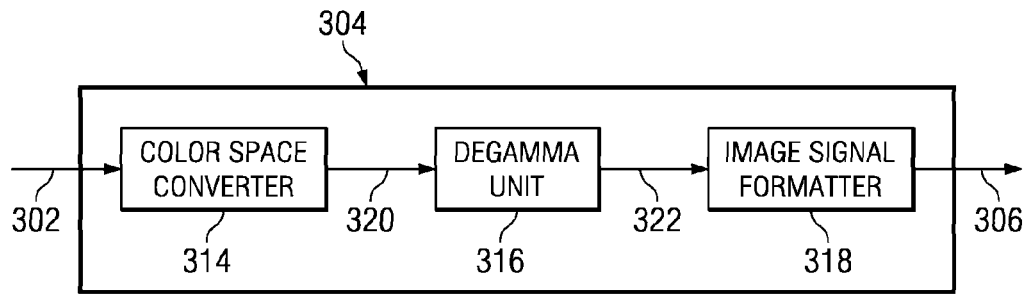
FIG. 5 illustrates an exemplary advantageous embodiment of a decoding process of an expanded decoding unit for decoding signals representing an image in an xvYCC color space using existing hardware that is designed to perform standard image decoding.

Turning now to FIG. 5, illustrated is a decoding process in an advantageous embodiment of expanded decoding unit 304 for decoding signals representing an image in an xvYCC color space using existing hardware that is designed to perform a standard image decoding process. Expanded decoding unit 304 can be implemented in a number of ways, an example of which is illustrated schematically in FIG. 5. Expanded decoding unit 304 comprises color space converter 314, degamma unit 316, and image signal formatter 318.

Input image signals 302 are received by color space converter 314 that converts the image signals 302 in one color space (e.g., in a $YC_bC_r$ or $xvYC_bC_r$ color space) into converted image signals 320 in a color space supported by the display system, (e.g., an RGB color space). Degamma unit 316 applies a standard degamma correction (for example, using a degamma correction with an exponent of −2.2, as described hereinbelow with reference to equation 1) to the converted image signals 320 that are output from color space converter 314 to produce degamma-corrected image signals 322. Image signal formatter 318 formats degamma-corrected image signals 322 produced by degamma unit 316 into digitized image signals 306 that can be displayed by the pixels of light valve 312 illustrated in FIG. 4.

Expanded decoding unit 304 is capable of decoding image signals in extended color spaces, such as an xvYCC color space. More particularly, expanded decoding unit 304 is capable of processing negative image components during decoding, such as a negative value for one or two RGB image components. For descriptive purposes, exemplary implementations of expanded decoding unit 304 illustrated in FIG. 5 will be discussed in the following wherein image signals 302 in a $YC_bC_r$ format of the xvYCC color space are decoded into RGB image signals in an RGB color space. To better describe operations of the functional modules in expanded decoding unit 304, it is assumed, without limitation, that a generalized process for encoding RGB data into YCC data is as follows.

To encode RGB data (produced by an image source), a gamma correction function is ordinarily applied at the image source to the components of the image signal representing the image data to compensate for the expected nonlinear optical response of a display device to an input image signal. The light-intensity response of a CRT display device to an input signal is generally approximated by the function $X^\gamma$, where the value of γ is about 2.2 for phosphors of common CRT displays. The inverse of this function is thus applied during encoding of RGB data so that the light-intensity response of an ordinary CRT display device will be reasonably linear, i.e., small values of RGB signal components are nonlinearly enhanced in magnitude to compensate for the nonlinear response of a CRT. A one-dimensional version of gamma encoding applied by an image source, is generally of the form $$Y' = g \cdot Y^{-\gamma} + c,$$

where Y is an image signal produced by an image source before application of gamma correction, g, γ, and c are constants, and Y' is the gamma-corrected image signal produced at the image source. A three-dimensional RGB version of gamma correction at an image source is represented below by equation 1, $$R' = g_R \times R^{-\gamma R} + c_g^R$$

$$G' = g_G \times G^{-\gamma G} + c_g^G,$$

$$B' = g_B \times B^{-\gamma B} + c_g^B \quad \text{(equation 1)}$$

wherein R, G, and B are three components of an image signal representing RGB image data, and R', G', and B' are gamma-corrected RGB image signal components produced at the image source. The coefficients $g_R$, $g_G$, and $g_B$ are coefficients of the gamma transfer functions for each respective image component. The exponents $\gamma_R$, $\gamma_G$, and $\gamma_B$ of the three R, G, and B components of the image signal, while typically 2.2 for traditional CRT-based display devices, may not be equal, depending on the color presentation properties of the image generation device. The constants $c_g^R$, $c_g^G$, and $c_g^B$ are also not necessarily equal.

The gamma-corrected R', G' and B' data are then transformed into $YC_bC_r$ data in an xvYCC color space as represented below by equation 2, $$Y' = a_{11} \times R' + a_{12} \times G' + a_{13} \times B'$$

$$C_b' = a_{21} \times R' + a_{22} \times G' + a_{23} \times B',$$

$$C_r' = a_{31} \times R' + a_{32} \times G' + a_{33} \times B' \quad \text{(equation 2)}$$

wherein Y', $C_b'$, and $C_r'$ may be in the format of floating point gamma-corrected $YC_bC_r$ data converted from the gamma-corrected RGB image signal components. The nine coefficients $a_{ij}$, i=1, ..., 3, and j=1, ..., 3, represent the contribution of the respective R', G', and B' gamma-corrected RGB image signal component to the respective gamma-corrected $YC_bC_r$ component.

The $YC_bC_r$ values (Y', $C_b'$, and $C_r'$) are then digitized into, for example, 8-bit, 10-bit, or other bit-valued integers, represented below by equation 3, $$Y = b_{11} \times Y' + b_{12}$$

$$C_b = b_{21} \times C_b' + b_{22}$$

$$C_r = b_{31} \times C_R' + b_{32} \quad \text{(equation 3)}$$

wherein $b_{11}$, $b_{12}$, $b_{21}$, $b_{22}$, $b_{31}$, and $b_{32}$ are coefficients, and Y, $C_b$, and $C_r$ are digitized gamma-corrected $YC_bC_r$ data, also referred to as encoded $YC_bC_r$ data. Thus, digitized gamma-corrected $YC_bC_r$ data are produced by an image source.

The process for decoding digitized gamma-corrected $YC_bC_r$ input data can be described as follows. First normalized (which may be floating-point) luminance and chrominance data $Y'C_b'C_r'$ are recovered from the digitized gamma-corrected as represented below by equation 4, which can be determined with coefficients to substantially invert the digitizing process performed by equation 3:

$$Y' = b_{11}' \times Y + b_{12}'$$

$$C_b' = b_{21}' \times C_b + b_{22}'.$$

$$C_r' = b_{31}' \times C_R + b_{32}' \quad \text{(equation 4)}$$

The normalized luminance and chrominance data are then further scaled and offset as necessary to ensure that the RGB data to be obtained in the following process are in a proper range, such as in the range from 0 to 255 in an 8-bit representation, as represented below by equation 5, $$Y = s_{11} \times Y' + s_{12}$$

$$C_b = s_{21} \times C_b' + s_{22}$$

$$C_n = s_{31} \times C_R' + s_{32} \quad \text{(equation 5)}$$

wherein $s_{11}$, $s_{21}$, and $s_{31}$ are scaling factors, and $s_{12}$, $s_{22}$, and $s_{32}$ are offset constants as necessary for a display application.

The scaled $YC_bC_r$ data are converted by a matrix multiplication representing a linear transformation into R', G' and B' data as represented below by equation 6:

$$R' = d_{11} \times Y + d_{12} \times C_b + d_{13} \times C_r$$

$$G' = d_{21} \times Y + d_{22} \times C_b + d_{23} \times C_r$$

$$B' = d_{31} \times Y + d_{32} \times C_b + d_{33} \times C_r \quad \text{(equation 6)}$$

wherein the nine matrix coefficients $d_{ij}$, i=1, ..., 3, and j=1, ..., 3, represent the contribution of the respective $YC_bC_r$ component to the respective R'G'B' component.

A degamma operation is then applied to the R'G'B' data to obtain RGB data without gamma correction. A degamma operation can be the inverse operation of that represented by equation 1.

Figure 6:
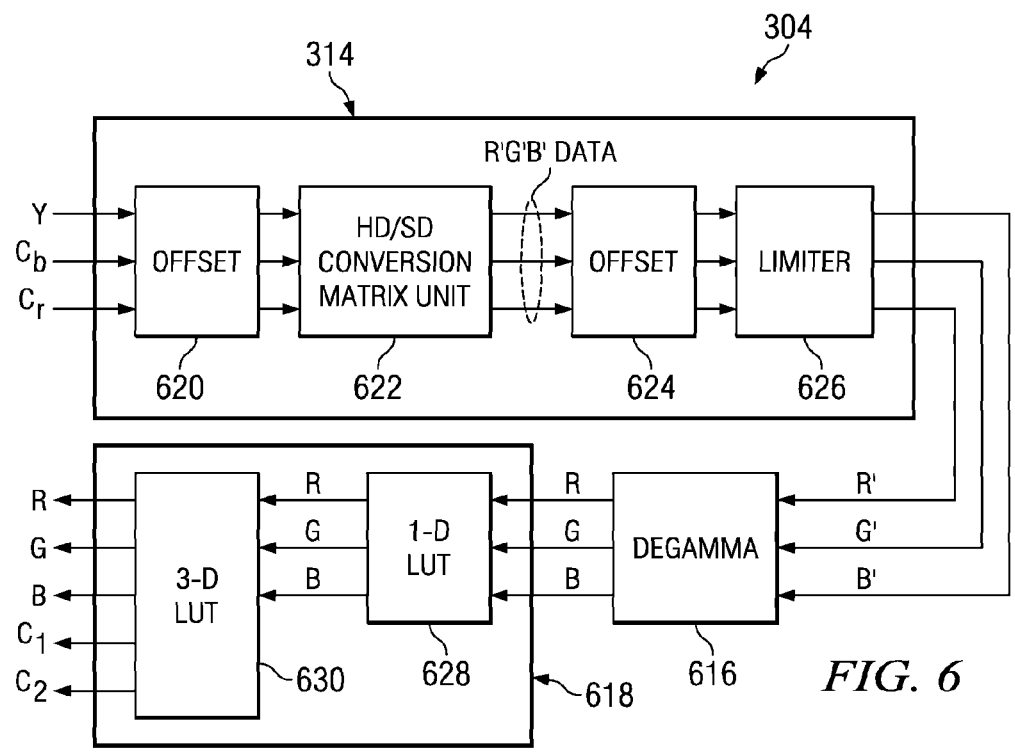
FIG. 6 illustrates an exemplary advantageous embodiment of an expanded decoding unit capable of decoding image signals from an xvYCC color space into a corresponding RGB color space using existing display hardware designed to perform standard image decoding.

Turning now to FIG. 6, illustrated is an exemplary embodiment of an expanded decoding unit 304 capable of decoding image signals from an xvYCC color space into, for example, a corresponding RGB color space, using existing display hardware designed to perform standard image decoding. The input xvYCC image signal, defined on a color space larger than ITU-R BT.709-2 RGB signals, can generate "extended" RGB signals with up to two negative image components, which are inadmissible in existing display arrangements where such image components are restricted to non-negative values. The extended RGB color space may also include additional color components as inputs to a display device, for example, cyan, magenta, or yellow, represented in FIG. 6 by the signals $C_1$ and $C_2$, to provide improved image fidelity and brightness.

The expanded decoding unit 304 in this exemplary embodiment comprises a chain of functional modules. Expanded decoding unit 304 comprises color space converter 314 that further comprises offset unit 620, HD/SD (high definition/standard definition) conversion matrix unit 622, offset unit 624, and limiter 626. The expanded decoding unit further comprises degamma unit 616, and image signal formatter 618 that further comprises 1-D LUT (one-dimensional lookup table) unit 628, and 3-D LUT (three-dimensional lookup table) unit 630.

Encoded digital image signals in a $YC_bC_r$ format of the xvYCC color space are input to offset unit 620 of the color space converter 314. The offset unit 620 applies an offset to the encoded xvYCC data. Specifically, offset unit 620 applies normalizing, scaling, and offset operations to each input channel of the $YC_bC_r$ data based on operations represented by equations 4 and 5. For example, for an input image signal comprising 8-bit $YC_bC_r$ components, offsets corresponding to RGB guard-band offsets of 16, 128, and 128, are applied, respectively, to the image signal components. For a signal comprising 10-bit components, offsets corresponding to RGB guard-band offsets of 64, 512, and 512 would be respectively applied.

The offset $YC_bC_r$ data are delivered to the input of HD/SD conversion matrix unit 622 that performs a matrix conversion operation on the normalized, scaled, and offset $YC_bC_r$ data to obtain R'G'B' data according to equation 6. The HD/SD conversion matrix 622 may be implemented with a 3-by-3 matrix with coefficients based on the coefficients in equation 6. Alternatively, the HD/SD conversion matrix unit 622 can include a module for performing scaling as described in equation 6 so as to ensure that extended RGB data to be obtained through the following functional modules are in a proper range, such as in the range from 0 to 255 for 8-bit $YC_bC_r$ channels.

Because the extended R'G'B' output of the HD/SD conversion matrix unit 622 may contain negative values corresponding to Y, $C_b$, and $C_r$ components, particularly when the input $YC_bC_r$ data are encoded in an extended color space (e.g., an xvYCC color space), offset unit 624 is provided to scale and offset (corresponding, for example, to equations 4 and 5, above) the extended R'G'B' values output from the HD/SD conversion matrix unit. It is recognized that at most two of the resulting extended R'G'B' components can be negative for an arbitrary image point in an xvYCC color space. If all three extended R'G'B' components were negative, a net absorption of light by a pixel would have to result, which is not a physically realizable event. The scaling and offsetting for each of the R'G'B' components is determined from the amount of negative offsetting value that is needed so that the R'G'B' component outputs of offset unit 624 are substantially non-negative for any potential input $YC_bC_r$ value, and fall within an admissible positive range of integer values.

For a corrupted or otherwise unlikely $YC_bC_r$ input datum, the offset operation performed by offset unit 624 may still result in an extended R'G'B' image component beyond a design R'G'B' range (e.g., beyond the range 0 to 255). This problem can be resolved by coupling limiter 626 to the output of offset unit 624 to adjust or otherwise limit the output data from offset unit 624 so that output data of limiter 626 are substantially non-negative, and in a desired range (e.g., in the range of 0 to 255).

Limiter 626 outputs extended R'G'B' data that may be represented as floating-point values. The R'G'B' data are delivered to degamma unit 616 that performs a degamma operation with a gamma correction appropriate for the display system. Some display systems might not require a non-linear gamma correction at all, such as a display system employing a DMD light valve, which controls light intensity by pulse-width modulating the orientation of micromirrors. Because the image data input to degamma unit 616 was offset at offset unit 624, which shifts the black level of the input image data, the degamma correction operation in degamma unit 616 includes the applied offsets at offset unit 624 to ensure a correctly referenced degamma operation. Accordingly, brightness and black levels of the image can be properly controlled.

Figure 7:
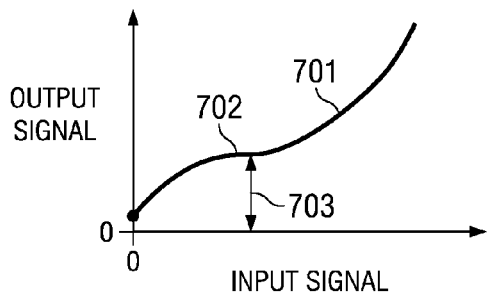
FIG. 7 illustrates a curved line representing a functional relationship of image component intensity before and after the degamma operation illustrated in FIG. 6.

Turning now to FIG. 7, illustrated is curved line 701 representing a functional relationship of image component intensity before and after the degamma operation illustrated in FIG. 6. The vertical axis of the diagram represents image data after a degamma operation, and the horizontal axis represents image data before the degamma operation. The black level is located at the saddle point 702 of the curve, at which point the slope is substantially horizontal. The saddle point 702 corresponds to the black color level offset of the image data, which is generally not at the zero point. The offset 703 of the saddle point from the horizontal axis accommodates the degamma operation by not changing the black level of the input image data, and is therefore dependent on offsets produced in color-space converter 304. The black level is conserved in the degamma operation, thereby accomplishing black-level control.

Referring again to FIG. 6, after the degamma operation performed in degamma unit 616, the extended R'G'B' image data are converted into gamma-corrected, extended RGB image data. The components of the extended RGB image data produced by degamma unit 616 are advantageously non-negative, but the black level may not be at the zero point, as represented by the nonzero offset 703 illustrated in FIG. 7.

The gamma-corrected, extended RGB image data are delivered to image data formatter 618 to produce image data to be displayed by light-valve pixels. Image data formatter 618 may provide enhanced color presentation of image data with an extended color gamut. In addition, and without limitation, the image data formatter may accommodate negative extended RGB signals in order to enable broadening of a display color space, may allow a viewer to select from several color correction modes, and may generate image signals to control secondary and/or white color sources. In the example illustrated in FIG. 6, the image data formatter is implemented, without limitation, as a Texas Instruments Brilliant Color™ image signal formatter. A Brilliant Color™ image signal formatter operates by a process described by G. S. Pettitt, et al., in U.S. Pat. No. 7,181,065, entitled "Enhanced Color Correction Circuitry Capable of Employing Negative RGB Values," issued Feb. 20, 2007, and by G. S. Pettitt, et al., in U.S. Pat. No. 7,164,397, entitled "Discrete Light Color Processor," issued Jan. 16, 2007, which are hereby incorporated by reference herein.

In image signal formatter 618, the gamma-corrected RGB data are fed into 1-D LUT 628 that outputs extended RGB image data components based on the extended input RGB image data. The 1-D LUT 628 can be implemented as a 3-by-3 matrix or by matrices of other suitable dimensions depending on the number of input image data components.

The 1-D LUT can perform a linear operation for each of the input RGB image components. The slope of the linearity (i.e., the ratio of a change of output data value to a change of input data value) may be determined from the applied offsets at offset unit 624. The offsets applied in offset unit 624 may be included in 1-D LUT 628.

The RGB image data components produced by 1-D LUT 628 are input to 3-D LUT 630 that produces output RGB image data components based on input data from the 1-D LUT 628. The output image data may include further color components, such as color components $C_1$ and $C_2$, to represent secondary colors, such as colors selected from yellow, cyan, magenta, and combinations thereof, or a white color signal. The 3-D LUT 630 can be implemented as a higher-dimension matrix or matrices depending on the number of components of the input image data. The output extended image data set R, G, B, $C_1$, and $C_2$ can be displayed by the light-valve pixels. A 3-D LUT can be constructed as described in U.S. Pat. Nos. 7,181,065 and 7,164,397, previously cited.

As discussed above, degamma unit 616 controls not only the brightness of the image data and its reproduction linearity, but also the black level by preserving the black level in the input and the output image data throughout the degamma operation. The white point (i.e., the white color temperature, and/or its tint) of the input image data can also be controlled by expanded decoding unit 304. For example, the offsets applied at offset unit 624 can be delivered to 3-D LUT 630 to include the applied offsets during the formatting operation so that the resulting white point produced by 3-D LUT 630 is correctly located within the cubical volume color space defined by the $RGBC_1C_2$ colors supported by the display system.

Figure 8:
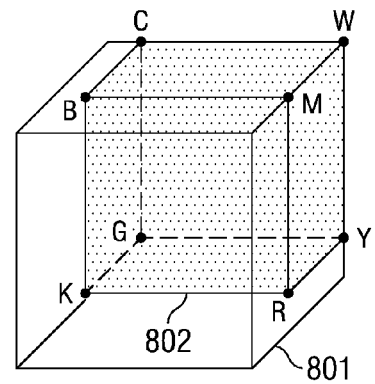
FIG. 8 illustrates a cubical color-space representation of the decoding scheme illustrated in FIG. 6.

Turning now to FIG. 8, illustrated is a cubical color-space representation of the decoding scheme illustrated in FIG. 6. The colors supported by the display system define a cubic color space that is represented in the figure by the volume of the outmost cube 801. After the chain of operations illustrated in FIG. 6, the output colors from the 3-D LUT 630 are within the volume of extended cube 801. Specifically, the white point (W) is located at a corner of the cube. The output colors R (red), G (green), B (blue), Y (yellow), C (cyan), and M (magenta) from the 3-D LUT 630 are within the smaller cube 802. The black level (K) of the output image data from the 3-D LUT 630 is within the volume of extended cube 801, such as at a corner of the smaller cube 802.

Figure 9:
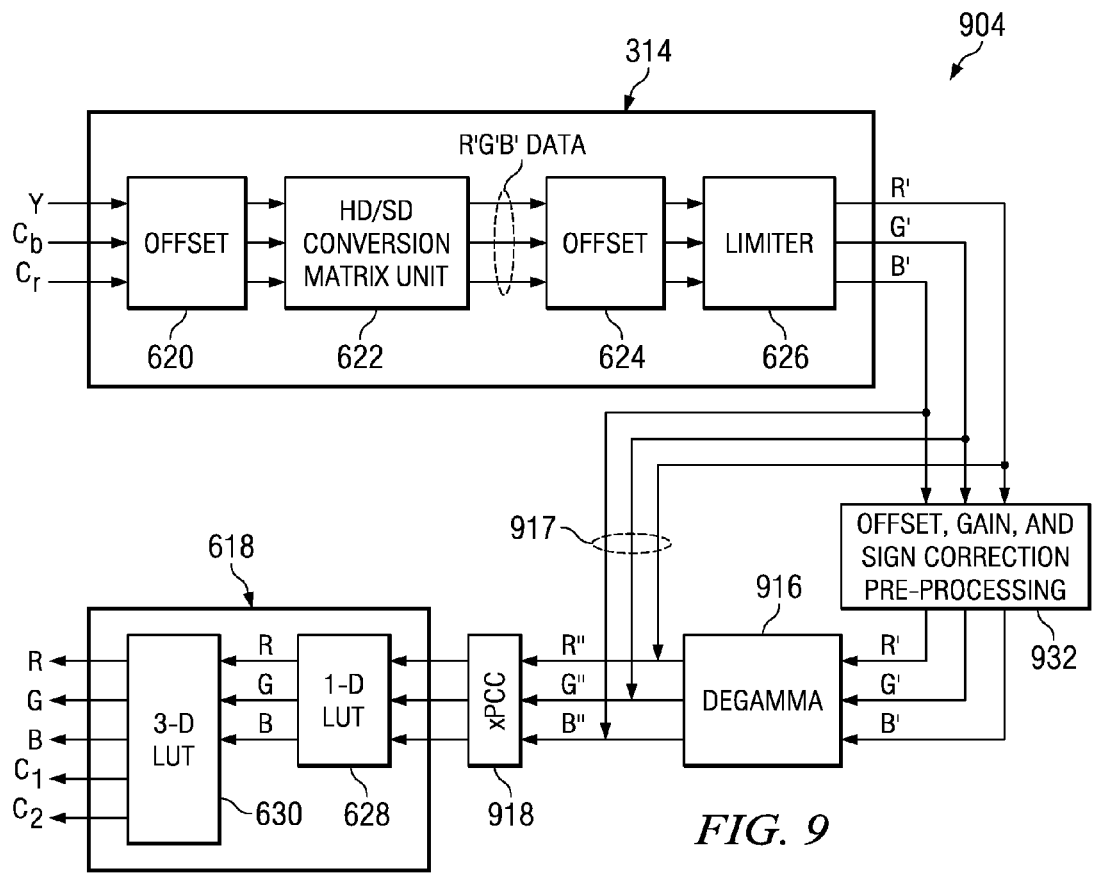
FIG. 9 illustrates an exemplary advantageous embodiment of an expanded decoding unit capable of decoding image signals from an xvYCC color space into an RGB color space using new display hardware.

Turning now to FIG. 9, illustrated is an exemplary embodiment of expanded decoding unit 904 capable of decoding image signals from an xvYCC color space into, for example, an RGB color space, using new display hardware. The input xvYCC image signal, is again defined on a larger color space than sRGB signals, and can generate extended RGB signals with negative image components which are inadmissible in existing display arrangements, such as where image components are restricted to non-negative values. The extended RGB color space may again include additional color components as inputs to a display device, for example, cyan, magenta, or yellow, represented in FIG. 9 by the signals $C_1$ and $C_2$. Color space converter 314 and image signal formatter 618 are constructed as described previously hereinabove with reference to FIG. 6.

The extended R'G'B' data output from color space converter 314 are input to offset, gain, and sign correction pre-processing unit 932. In this example, pre-processing unit 932 removes the offsets, gains, and signs from the offset and scaled R'G'B' data from the color space converter 314, and converts the data into pre-processed R'G'B' data. The gain removed from each of the R'G'B' image components was obtained during color space conversion, such as during scaling with the HD/SD conversion matrix unit 622. The sign is removed and stored for later processing from the negative R'G'B' data values such that all image data input to the following degamma unit 916 are non-negative values. The removal of the sign, producing thereby the absolute value of the data at the output of pre-processing unit 932, and reattachment after processing in degamma unit 916 is represented in FIG. 9 by signal paths 917.

The pre-processed R'G'B' data are delivered to degamma unit 916. Because the input R'G'B' data into degamma unit 916 have their signs, gains, and offsets removed, the degamma operation decodes only the amplitudes of the input R'G'B' data signals. During the degamma operation, the signs, gains, and offsets are re-added to the corresponding RGB data. For this purpose, as previously described, the sign bits of the individual R'G'B' data channels are delivered to the output data channels of degamma unit 916 as indicated in FIG. 9 by signal paths 917. The degamma operation 916 ensures that the black levels of output color components from the degamma unit are properly positioned. The processed R"G"B" image data from degamma unit 916 are delivered to image signal formatter 618 to obtain the extended output image data set R, G, B, $C_1$, and $C_2$ in a way as discussed hereinabove with reference to FIG. 6, which will not be repeated in the interest of brevity.

The process performed in blocks 916 and 932 can be represented by the equation below for the R image component:

$$R = \text{sign}(R') \cdot d\gamma\left[\left|\left(\frac{1}{gain_R}\right) \cdot (R' - offset_R)\right|\right].$$

In the equation above, the function $d\gamma[\cdot]$ represents the degamma operation, $gain_R$ represents the adjusted gain applied to the R image component, and $offset_R$ represents the offset removed from the R image component. Similar equations represent processes in blocks 916 and 932 performed on other image components.

The output signals from degamma unit 916 are passed to xPCC unit (extended Primary Color Corrector unit) 918 that maps RGB image components that may include negative components into RGB image components with non-negative components for a display that can reproduce a larger color gamut. An xPCC unit thus produces enhanced, positive RGB image components. Mapping RGB image components that may include negative components into enhanced-gamut RGB image components with non-negative components is described in U.S. Pat. No. 7,181,065, entitled "Enhanced Color Correction Circuitry Capable of Employing Negative RGB Values," cited previously hereinabove.

Figure 10:
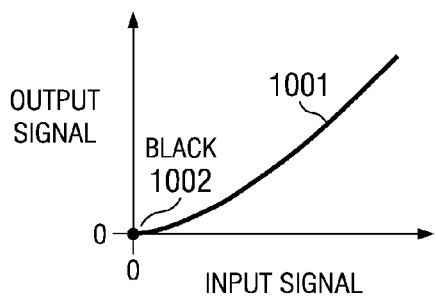
FIG. 10 illustrates a graph with a curved line representing a functional relationship of image component intensity before and after a degamma operation of the expanded encoding unit illustrated in FIG. 9.

Turning now to FIG. 10, illustrated is a graph with curved line 1001 representing a functional relationship of image component intensity before and after the degamma operation of the expanded encoding unit illustrated in FIG. 9. The vertical axis of the diagram represents image data after a degamma operation, and the horizontal axis represents image data before the degamma operation. The saddle point of the curve, 1002, which corresponds to the black color level, is the point where the slope of curved line 1001 is substantially horizontal, and is now located at the origin (0, 0) in this graph.

With a decoding scheme as described with reference to FIGS. 9 and 10, not only the brightness level and its linearity, but also the white and black levels of an input image can be efficiently controlled.

Figure 11:
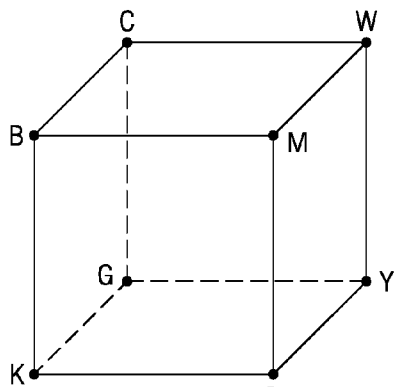
FIG. 11 illustrates a cubical color space representing a color space supported by the display system illustrated in FIG. 9.

Turning now to FIG. 11 illustrated schematically is a cubical color space representing a color space supported by a display system constructed according to an embodiment as described with reference to FIG. 9. The black color level is represented by the point K, and the white level by the point W. The color outputs from the 3D LUT 630 in FIG. 9 extend within the entire volume of the cube, indicating full utilization of the color reproduction capability of the display system. The primary colors, red, green, and blue, are indicated respectively by the points R, G, and B, and the secondary colors, magenta, cyan, and yellow, respectively by the points M, C, and Y.

Figure 12:
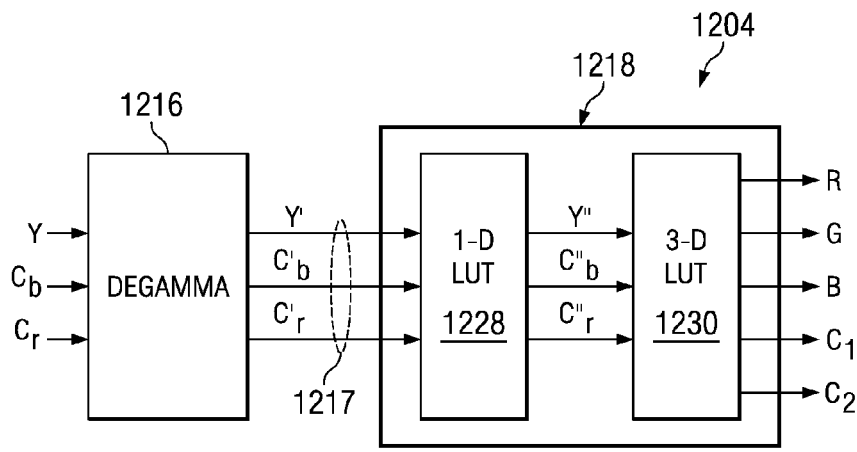
FIG. 12 illustrates a further exemplary embodiment of an expanded decoding unit capable of decoding image signals from an xvYCC color space into an extended RGB color space for a display system using new display hardware.

Turning now to FIG. 12 illustrated is a further exemplary embodiment of an expanded decoding unit 1204 capable of decoding image signals from an xvYCC color space into, for example, an extended RGB color space, for a display system using new display hardware. The encoded input xvYCC image signal, is again defined on an extended xvYCC color space, and is directly input to degamma unit 1216 as illustrated in the figure. Degamma unit 1216 performs the degamma operation on the input $YC_bC_r$ image data, and at the same time ensures preservation of the black level. The expanded decoding unit 1204 performs a decoding operation as necessary and generates extended RGB signals with negative image components, or, depending on the requirements of the display device, extended RGB signals with non-negative image components. The extended RGB color space may again include additional color components as inputs to a display device, for example, cyan, magenta, or yellow, represented in FIG. 12 by the signals $C_1$ and $C_2$. The operations illustrated in FIG. 12 can collectively be performed with a 3-D LUT.

Figure 13:
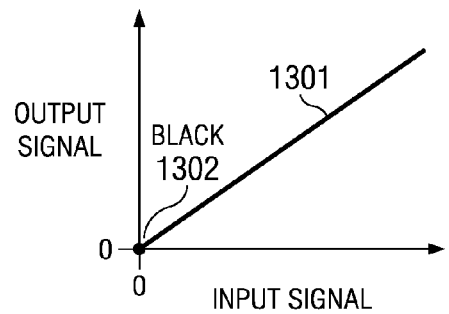
FIG. 13 illustrates a graph with a line representing a linear relationship of image component intensity before and after the degamma operation illustrated in FIG. 12.

Turning to FIG. 13, illustrated is a graph with line 1301 representing a linear relationship of image component intensity before and after the degamma operation illustrated in FIG. 12. The vertical axis of the diagram in FIG. 13, as in FIG. 10, represents image data after a degamma operation, and the horizontal axis represents image data before the degamma operation. The black level 1302 is at the origin of the curve.

Referring again to FIG. 12, the gamma-corrected $YC_bC_r$ data 1217 can then be fed into image signal formatter 1218, (e.g., a Texas Instruments Brilliant Color™ image signal formatter, as described hereinabove with reference to FIG. 6) that comprises 1-D LUT 1228 and 3-D LUT 1230. In this exemplary embodiment, degamma unit 1216 performs a linear operation to convert input $YC_bC_r$ data into $YC_bC_r$ data that are compatible with the display system. The data formatter including the 1-D LUT 1229 and 3-D LUT 1230 performs the desired data conversion that converts the gamma-corrected $YC_bC_r$ data into extended RGB image data that can be displayed by the light-valve pixels. The image data may optionally include further image data components such as image data components $C_1$, and $C_2$ described previously hereinabove for a display device that can accommodate more than three primary colors. For this purpose, the 3-D LUT 1230 comprises color-space conversion coefficients that include effects of offsets and scaling during previous color-space conversion processing.

Figure 14:
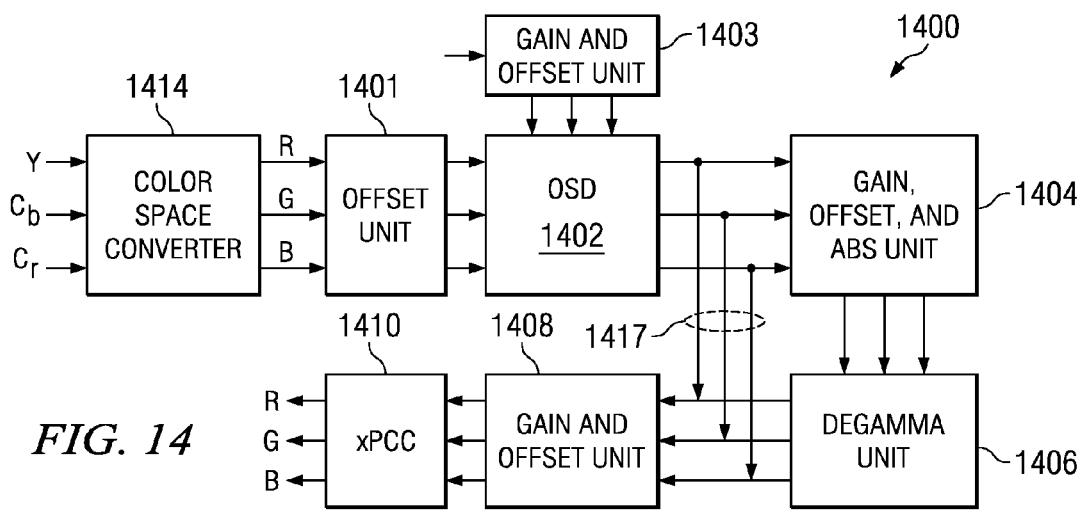
FIG. 14 illustrates an embodiment of an exemplary decoding arrangement capable of decoding xvYCC colors using new display hardware.

Turning now to FIG. 14, illustrated is an embodiment of a further exemplary decoding arrangement 1400 capable of decoding xvYCC colors using new display hardware. The decoding arrangement 1400 utilizes color-space converter 1414, offset unit 1401, OSD (on-screen display) unit 1402, gain, offset, and ABS (absolute value) unit 1404, degamma unit 1406, gain and offset unit 1408, and xPCC unit 1410, which are serially positioned along the decoding data flow.

The color-space converter unit 1414 performs a color-space conversion operation on the input $YC_bC_r$ image data, and outputs converted (extended) RGB data to offset unit 1401. Color-space converter 1414 comprises a transfer matrix with matrix elements determined so that the color-space converted RGB data are scaled, for example, by 0.5, and are offset by predetermined amounts, such as 0.5 for the red (R) component, 0.25 for the green (G) component, and 0.25 for the blue (B) component. Other offset amounts, as well as other scaling factors, may also be applied depending upon the color-space conversion scheme.

Offset unit 1401 offsets the RGB data output from color-space converter 1414 in the same way as offset unit 624 that was described with reference to FIGS. 6 and 9, and will not be redescribed in the interest of brevity. The offset RGB image data from offset unit 1401 are delivered to OSD unit 1402 that applies further gains and offsets to the RGB image data as necessary for a particular display system. The gains and offsets may be selectively provided by a user input, such as from gain and offset unit 1403. The gains and offsets of the RGB image data from OSD unit 1402 are removed by gain, offset, and ABS unit 1404, which also removes the sign of the image data. The absolute values of the RGB data are accordingly passed through degamma unit 1406. The signs of the corresponding RGB values are reattached to the RGB values after processing by degamma unit 1406, as represented by signal paths 1417. An advantage of this configuration is that there may be substantially no change to an existing degamma unit. It also allows a degamma correction operation to be symmetrically reflected around the origin of the pixel intensity coordinate system.

Gain and offset unit 1408 following degamma unit 1406 offsets the output RGB data after the degamma correction operation, allowing a mode in which the degamma correction operation is not required to be reflected around the origin of the pixel intensity coordinate system. As a consequence, degamma unit 1406 would need to be correspondingly configured to track the offsets and sign of the component image signals to properly reconstruct black and white color levels.

The outputs from gain and offset unit 1408 are passed to xPCC 1410 that produces RGB image components with an enhanced color gamut, as described previously hereinabove with reference to FIG. 9.

Thus, an image decoding system capable of decoding image signals in an extended color space, advantageously in different formats such as an xvYCC color space, has been introduced. The image decoding system advantageously accommodates application in existing display systems using conventional hardware techniques to decode xvYCC-encoded image data. The image decoding system can also advantageously accommodate decoding xvYCC-encoded image data in new hardware architectures. The image decoding system can further advantageously accommodate converting RGB image data with negative component values to RGB image data with non-negative values using an extended PCC (primary color corrector) algorithm.

In an advantageous embodiment, an image decoding system includes a color space converter coupled to a signal input to receive an encoded image signal of a first format to produce a scaled, offset image signal of a second format. A degamma correction unit is coupled to an output of the color space converter to produce a degamma corrected image signal, and an image signal formatter is coupled to an output of the degamma correction unit to produce an image signal capable of being displayed by a display system. In an advantageous embodiment, the encoded image signal of the first format is in a $YC_bC_r$ format capable of representing RGB image signal components with at least one negative value. In a further advantageous embodiment, the scaled, offset image signal of the second format produced by the color space corrector includes an offset of a black level of a signal component from zero. In a further advantageous embodiment, the offset of the black level of a signal component from zero is utilized by the degamma correction unit to produce the degamma corrected image signal. In an advantageous embodiment, the color space converter applies a linear matrix transform to the encoded image signal to produce the scaled, offset image signal of the second format. In an advantageous embodiment, a component of the image signal capable of being displayed by a display system spans the full range of values from zero to $2^n - 1$ where n is the number of bits that represent the component of the image signal. In a further advantageous embodiment, gain, offset, and sign are removed from the scaled, offset image signal of the second format before the degamma correction operation is performed by the degamma correction unit. The sign is then reapplied to the degamma corrected image signal after the degamma correction operation is performed by the degamma correction unit. In a further advantageous embodiment, an extended primary color converter is coupled between the degamma correction unit and the image signal formatter to produce enhanced, positive RGB image signal components for the image signal formatter. In an advantageous embodiment, the image signal formatter produces the image signal capable of being displayed by a display system with non-negative signal components. In an advantageous embodiment, the image signal formatter comprises a three-dimensional lookup table. In a further advantageous embodiment, the image signal formatter comprises a one-dimensional lookup table and a three-dimensional lookup table.

Another exemplary embodiment of the invention provides a method of decoding an image signal. In an advantageous embodiment, the method includes receiving an encoded image signal in a first format, converting the encoded image signal of the first format into a scaled, offset image signal of a second format, applying a degamma correction to the scaled, offset image signal of the second format to produce a degamma corrected image signal, and formatting the degamma corrected image signal to produce a displayable image signal capable of being displayed by a display system. In an advantageous embodiment, the encoded image signal in the first format is encoded in a $YC_bC_r$ format. In an advantageous embodiment, converting the encoded image signal of the first format includes converting the encoded image signal with a 3-by-3 matrix. In an advantageous embodiment, the method includes producing the scaled, offset image signal of the second format in a scaled, offset RGB format. In an advantageous embodiment, the scaled, offset image signal of the second format includes a black level offset from the origin of the image coordinate system. In an advantageous embodiment, the method includes converting the encoded image signal of a first format into a scaled, offset image signal of a second format with a negative image signal component. In an advantageous embodiment, formatting the degamma corrected image signal includes using a three-dimensional lookup table. In an advantageous embodiment, formatting the degamma corrected image signal includes using a one-dimensional and a three-dimensional lookup table. In an advantageous embodiment, the method includes limiting a signal component of the image signal of the second format to the range zero to $2^n - 1$ where n is the number of bits that represent the image signal component. In an advantageous embodiment, the method includes formatting the degamma corrected image signal to produce secondary colors for the displayable image signal. In an advantageous embodiment, formatting the degamma corrected image signal includes producing the displayable image signal with non-negative signal components.

Although embodiments and their advantages have been described in detail, it should be understood that various changes, substitutions and alterations can be made herein without departing from the spirit and scope of the invention as defined by the appended claims. For example, it will be readily understood by those skilled in the art that the circuits, circuit elements, and utilization of techniques to form the processes and systems providing efficient implementation of an image display system to decode image signals in an extended color space in different formats as described herein may be varied while remaining within the broad scope of embodiments. Further, these techniques can be applied to other systems such as image recording, storage, or transmission systems requiring decoding of image signals in an extended color space in different formats.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for decoding an input signal, comprising:

receiving image data signals in a digitized gamma-corrected YCbCr format encoded in an extended YCC color space;

normalizing the received image data signals to recover normalized luminance and chrominance $Y'C_b'C_r'$ formatted data signals from the YCbCr formatted data signals;

scaling and offsetting the normalized $Y'C_b'C_r'$ formatted data signals to offset for guard-banding;

performing a conversion operation on the normalized, scaled and offset $Y'C_b'C_r'$ formatted data signals to obtain extended R'G'B' formatted data signals;

scaling and offsetting the extended R'G'B' formatted data signals, the scaling and offsetting for each extended R'G'B' component determined by an amount of negative offsetting needed so the extended R'G'B' components will be substantially non-negative for any potential input YCbCr format value and fall within a given positive range of integer values; and performing a degamma operation on the extended R'G'B' formatted data to obtain RGB formatted data without gamma correction;

wherein the normalizing comprises recovering normalized luminance and chrominance data $Y'C_b'C_r'$ determined by:

$Y' = b_{11}' \times Y + b_{12}'$ $C_b' = b_{21}' \times C_b + b_{22}'$ $C_r' = b_{31}' \times C_R + b_{32}'$ with coefficients determined to substantially invert the digitizing process performed to transform gamma-corrected RGB data into YCbCr format.

2. The method of claim 1, wherein the received image data signals are defined on a color space larger than ITU-R BT.709-2 RGB signals that can generate RGB signals with up to two negative image components.

3. The method of claim 1, wherein the extended YCC color space is an xvYCC color space.

4. The method of claim 3, wherein the normalized luminance and chrominance data $Y'C_b'C_r'$ are recovered as floating-point data.

5. The method of claim 3, wherein the scaling and offsetting of the normalized $Y'C_b'C_r'$ formatted data signals is determined by:

$$Y = s_{11} \times Y' + s_{12}$$

$$C_b = s_{21} \times C_b' + s_{22}$$

$$C_r = s_{31} \times C_R' + s_{32}$$

where $s_{11}$, $s_{21}$, and $s_{31}$ are scaling factors, and $s_{12}$, $s_{22}$, and $s_{32}$ are offset constants.

6. The method of claim 5, wherein performing the normalized, scaled and offset $Y'C_b'C_r'$ formatted data signals are converted by a matrix multiplication represented by:

$$R' = d_{11} \times Y + d_{12} \times C_b + d_{13} \times C_r$$

$$G' = d_{21} \times Y + d_{22} \times C_b + d_{23} \times C_r$$

$$B' = d_{31} \times Y + d_{32} \times C_b + d_{33} \times C_r$$

where the matrix coefficients $d_{ij}$ represent the contribution of the respective $YC_bC_r$ component to the respective R'G'B' component.

7. A method for decoding an input signal, comprising:
receiving image data signals in a digitized gamma-corrected YCbCr format encoded in an extended YCC color space;
normalizing the received image data signals to recover normalized luminance and chrominance $Y'C_b'C_r'$ formatted data signals from the YCbCr formatted data signals;
scaling and offsetting the normalized $Y'C_b'C_r'$ formatted data signals to offset for guard-banding;
performing a conversion operation on the normalized, scaled and offset $Y'C_b'C_r'$ formatted data signals to obtain extended R'G'B' formatted data signals;
scaling and offsetting the extended R'G'B' formatted data signals, the scaling and offsetting for each extended R'G'B' component determined by an amount of negative offsetting needed so the extended R'G'B' components will be substantially non-negative for any potential input YCbCr format value and fall within a given positive range of integer values; and
performing a degamma operation on the extended R'G'B' formatted data to obtain RGB formatted data without gamma correction;
wherein the scaling and offsetting of the normalized $Y'C_b'C_r'$ formatted data signals is determined by:

$$Y = s_{11} \times Y' + s_{12}$$

$$C_b = s_{21} \times C_b' + s_{22}$$

$$C_r = s_{31} \times C_R' + s_{32}$$

where $s_{11}$, $s_{21}$, and $s_{31}$ are scaling factors, and $s_{12}$, $s_{22}$, and $s_{32}$ are offset constants.

8. A method for decoding an input signal, comprising:
receiving image data signals in a digitized gamma-corrected YCbCr format encoded in an extended YCC color space;
normalizing the received image data signals to recover normalized luminance and chrominance $Y'C_b'C_r'$ formatted data signals from the YCbCr formatted data signals;
scaling and offsetting the normalized $Y'C_b'C_r'$ formatted data signals to offset for guard-banding;
performing a conversion operation on the normalized, scaled and offset $Y'C_b'C_r'$ formatted data signals to obtain extended R'G'B' formatted data signals;
scaling and offsetting the extended R'G'B' formatted data signals, the scaling and offsetting for each extended R'G'B' component determined by an amount of negative offsetting needed so the extended R'G'B' components will be substantially non-negative for any potential input YCbCr format value and fall within a given positive range of integer values; and
performing a degamma operation on the extended R'G'B' formatted data to obtain RGB formatted data without gamma correction;
wherein performing the normalized, scaled and offset $Y'C_b'C_r'$ formatted data signals are converted by a matrix multiplication represented by:

$$R' = d_{11} \times Y + d_{12} \times C_b + d_{13} \times C_r$$

$$G' = d_{21} \times Y + d_{22} \times C_b + d_{23} \times C_r$$

$$B' = d_{31} \times Y + d_{32} \times C_b + d_{33} \times C_r$$

where the matrix coefficients $d_{ij}$ represent the contribution of the respective $YC_bC_r$ component to the respective R'G'B' component.

* * * * *